(No Model.)
F. HAYES & F. J. LEWIS.
KNIFE.
No. 495,110. Patented Apr. 11, 1893.
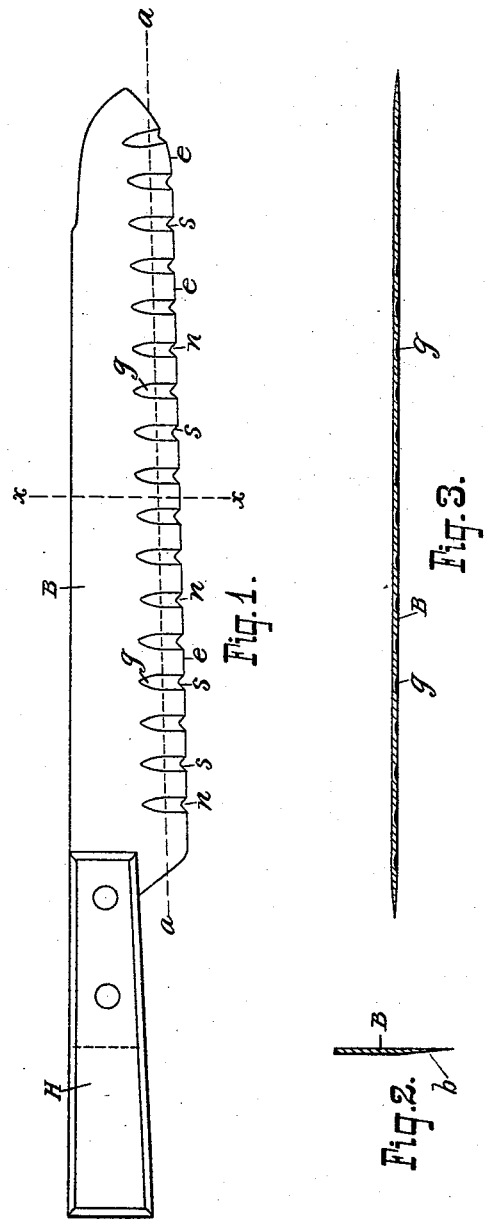
Witnesses
A. Edmunds
Jas. E. Edmunds
Inventors
Francis Hayes
Fred J. Lewis
By P. J. Edmunds
Atty

UNITED STATES PATENT OFFICE.

FRANCIS HAYES AND FRED J. LEWIS, OF LONDON, CANADA, ASSIGNORS OF ONE-THIRD TO WILLIAM S. B. BARKWELL, OF SAME PLACE.

KNIFE.

SPECIFICATION forming part of Letters Patent No. 495,110, dated April 11, 1893.

Application filed October 21, 1891. Renewed August 27, 1892. Serial No. 444,260. (No model.)

*To all whom it may concern:*

Be it known that we, FRANCIS HAYES, a subject of the Queen of Great Britain, and FRED J. LEWIS, a citizen of the United States, residing at the city of London, in the Province of Ontario, Canada, have jointly invented certain new and useful Improvements in Bread-Knives, of which the following specification, taken in connection with the accompanying drawings, forms a full, clear, and exact description.

This invention relates particularly to a knife used to cut loaves into slices, but it may be used as a knife or saw to cut meat, or for cutting fruits or vegetables of any kind, the object being to readily and easily cut loaves into thin slices without forming crumbs. At the same time, all danger of cutting or injuring the operator is completely prevented.

This invention consists of a knife, in the cutting edge of the blade of which, notches are formed at certain intervals, leaving a portion of the cutting edge of the blade between each notch, and forming cutting breasts or angular cutting edges of the sides of said notches, and then forming shallow grooves for a short distance back from, and on a line with said notches, in one side of the blade, as will be hereinafter first fully set forth and described and then pointed out in the claim.

Reference is had to the accompanying drawings, wherein—

Figure 1. is a side elevation of a knife embodying our invention. Fig. 2. is a cross sectional view of the blade on the line, x, x, of Fig. 1. Fig. 3. is a longitudinal sectional view of the blade on the line, a, a, of Fig. 1.

H, designates the handle; and, B, the knife blade secured thereto. This knife blade, B, is preferably beveled or sharpened on one side only as shown at, b, Fig. 2. And in the cutting edge of this knife blade, B, notches, n, are formed at intervals apart, leaving portions, e, of the cutting edge of the blade between each notch, as shown in Fig. 1. of the accompanying drawings; and, g, designates shallow grooves formed in one side only of the knife blade in a line with the notches, n, and a short distance back and from the cutting edge of the blade, as shown in Figs. 1 and 3, of the accompanying drawings. The sides of the notches, n, are sharpened, and form short breasts or cutting edges, s, which abut against small independent portions of the bread, meat, &c., at an angle to that at which the portions, e, of the cutting edge of the knife engage therewith, so that when cutting with this knife, the blade is cutting at two different angles, viz:—parallel with, and at an angle to the cutting edge of the blade. When the knife is being drawn toward, or pushed from the operator, this construction forms a knife blade which readily and easily cuts through the bread, and hardest crust, with very little pressure, and forming very little if any crumbs, and this operation is intended to be performed with the bread resting on the cutting board or bread plate, in which case, the knife is operated away from the operator, thereby completely preventing any possibility of injury to the latter when the knife is in operation. These grooves, g, in one side of the blade are formed for the purpose of relieving the bread from the rubbing of the blade at the cutting edge when in operation, which almost completely if not altogether prevents the rubbing off, of portions of, and the formation of bread crumbs, from this cause. At the same time, by forming these grooves, g, the process of sharpening the cutting breasts, s, is facilitated.

This construction of a knife is particularly adapted for cutting loaves into slices. At the same time, we intend it to be used as a bread or meat knife or saw, and used for cutting bread, meat, and fruits or vegetables of any kind.

Having thus described our invention, we claim—

As an article of manufacture, a handle, H, in combination with a blade, B, sharpened on one side, and having notches, n, formed at intervals apart, in the cutting edge thereof, and portions, e, of the cutting edge between said notches, n, the sides of which notches are sharpened, and form breasts or angular cutting edges, s, and the grooves, g, formed in one side of the blade only, and on a line with the notches, n, and extending back a short distance from the cutting edge of said
5 blade, substantially as shown and described, and for the purpose specified.

In testimony whereof we affix our signatures in the presence of the two undersigned witnesses.

FRANCIS HAYES.
FRED J. LEWIS.

Witnesses:
P. J. EDMUNDS,
JAS. E. EDMUNDS.